(12) United States Patent
Norbits

(10) Patent No.: US 9,139,046 B2
(45) Date of Patent: Sep. 22, 2015

(54) ADJUSTABLE INSERT FOR A TIRE

(75) Inventor: George T. Norbits, East Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 1327 days.

(21) Appl. No.: 11/938,839

(22) Filed: Nov. 13, 2007

(65) Prior Publication Data

US 2009/0120548 A1    May 14, 2009

(51) Int. Cl.
*B60C 7/00* (2006.01)
*B60C 7/12* (2006.01)

(52) U.S. Cl.
CPC ........... *B60C 7/12* (2013.01); *Y10T 152/10378* (2015.01)

(58) Field of Classification Search
CPC ............... B60C 7/00; B60C 7/10; B60C 7/12
USPC ........................................ 152/208.1
See application file for complete search history.

(56) References Cited

U.S. PATENT DOCUMENTS

| | | | | |
|---|---|---|---|---|
| 1,056,976 A | * | 3/1913 | Divine | 152/323 |
| 1,396,778 A | * | 11/1921 | Parham | 152/385 |
| 1,492,509 A | * | 4/1924 | Brown | 152/306 |
| 3,329,192 A | * | 7/1967 | Roque | 152/327 |
| 3,842,887 A | * | 10/1974 | Mendes | 152/370 |
| 5,183,306 A | * | 2/1993 | Emilsson | 295/11 |
| D507,522 S | | 7/2005 | Becker et al. | |
| 7,174,936 B2 | | 2/2007 | Becker et al. | |
| 2007/0240800 A1 | * | 10/2007 | Sauerwald et al. | 152/152.1 |

FOREIGN PATENT DOCUMENTS

| | | | |
|---|---|---|---|
| DE | 2354612 | * | 5/1975 |
| DE | 2106225 | * | 12/1975 |
| DE | 3523506 | * | 1/1987 |
| DE | 19710434 | * | 9/1998 |
| FR | 2595631 | * | 9/1987 |
| FR | 2613669 | * | 10/1988 |
| GB | 129154 | * | 7/1919 |
| GB | 242459 | * | 11/1925 |
| JP | 60-248409 | * | 12/1985 |
| JP | 3-114904 | * | 5/1991 |
| JP | 2006-200360 | * | 8/2006 |
| WO | WO 2006001875 | * | 1/2006 |

OTHER PUBLICATIONS

U.S. Appl. No. 11/044,234, filed Oct. 6, 2006.

(Continued)

*Primary Examiner* — Justin Fischer
(74) *Attorney, Agent, or Firm* — Liell & McNeil Attorneys, PC

(57) ABSTRACT

An adjustable insert for a tire. A tire includes an annular body of elastomeric material. The annular body may include a plurality of unpressurized cavities. A plurality of adjustable inserts may be arranged in the plurality of unpressurized cavities. The adjustable inserts may have an expandable portion sized to fit in a portion of the unpressurized cavities. The adjustable insert may be configured to adjust a compression of each cavity and modify the deflection rate of the tire.

10 Claims, 4 Drawing Sheets

(56) References Cited

OTHER PUBLICATIONS

Information Release Memo, TR07-03, Jul. 2007 "Smooth Tread Cat Flexport Tires Are Now Available for Skid Steer Loaders" [online] (retrieved on Feb. 14, 2008) Retrieved from the Cat@work website using internet <URL: https://catatwork.cat.com/wps/myportal/empcat>.

Information Release Memo, WTB04-02, May 2004 "Wheels, Tires and Belted Track" [online] (retrieved on Feb. 14, 2008) Retrieved from the Cat@work website using internet <URL: https://catatwork.cat.com/wps/myportal/empcat>.

Information Release Memo, TWB02-12, Sep. 2002 "Caterpillar Skid Steer Loader Aftermarket Tire Line Expanded to Include the Extreme Duty Solid Flexport" [online] (retrieved on Feb. 14, 2008) Retrieved from the Cat@work website using internet <URL: https://catatwork.cat.com/wps/myportal/empcat>.

Cat Flexport Tires Available New and Remanufactured for Small and Medium Wheel Loaders [online] (retrieved on Feb. 14, 2008) Retrieved from the Cat@work website using internet <URL: https://catatwork.cat.com/wps/myportal/empcat>.

* cited by examiner

ADJUSTABLE INSERT FOR A TIRE

TECHNICAL FIELD

The present disclosure relates generally to tires, and more specifically to unpressurized cavities in the non-pneumatic tires.

BACKGROUND

Because machines often operate in harsh environments and are continuously cycling through no load and relatively heavy loads, tires must be durable and not susceptible to flats. In fact, it has been found that although conventional pneumatic tires have adjustable compressions by increasing or decreasing air pressure and provide a smooth ride, pneumatic tires often are less durable than solid tires. However solid tires are known to provide a less than smooth ride and do not have an adjustable compression.

In order to provide sufficient durability, tires can be non-pneumatic, and thus, are comprised of solid or semi-solid products. Although the non-pneumatic tires are more durable than pneumatic tires, the non-pneumatic tires are often too stiff to provide a smooth ride and lack the contact area with the ground to provide relatively good traction. In order to improve the ride of the machine, some non-pneumatic tires include a radial band of unpressurized cavities, or recesses. The radial band lessens the stiffness and increases the deformation of the tire so it will ride better than a solid tire. Moreover, the cavities 30 permit the material to deflect by bending, rather than by either pure compression or stretching, thereby limiting the material strain while permitting substantial deflections, but the tire still provides a stiff ride more similar to a solid tire than a pneumatic tire.

One non-pneumatic tire is shown in U.S. Pat. No. D499,065, issued to Shapiro et al, on Nov. 30, 2004, and defines a radial band of aperatures, or cavities, that enable the tire to deform due to a load and provides an area of contact with the road that significantly decreases stiffness as compared to a solid tire. However, over the life of the tire, the tire may begin to lose stiffness beyond the original intent of the tire and may result in a loss in traction and load capability. Additionally, as ground conditions and use of the machine may vary, it is not possible to modify the stiffness of the tire to the applications, as may be done with a pneumatic tire. Further, as the tire is required to handle increasingly higher loads, the cavities may eventually collapse.

The present disclosure is directed at overcoming one or more of the problems set forth above.

SUMMARY OF THE DISCLOSURE

It is to be understood that both the foregoing general description and the following detailed description are exemplary and explanatory only and are not restrictive of the invention as claimed.

One aspect of the present disclosure is directed toward an adjustable insert for at least one of a plurality of cavities in a ground engaging member. The adjustable insert may include an expandable portion sized to fit in a portion of the selected cavity and a mechanism configured to expand the expandable portion against the portion of the selected cavity.

Another aspect of the present disclosure is directed toward a ground engaging member. The ground engaging member may be comprised of an annular body of elastomeric material, a plurality of unpressurized cavities, and a plurality of adjustable inserts. The plurality of unpressurized cavities may be arranged in the annular body. The plurality of adjustable inserts may be arranged in a portion of the plurality of unpressurized cavities.

Another aspect of the present disclosure is directed to a method for adjusting the compression of a ground engaging member. The method may comprise structuring an adjustable insert within at least one of a plurality of unpressurized cavities arranged within an annular body of elastomeric material of the ground engaging member and expanding at least a portion of an outer geometry of the adjustable insert against a portion of an inner geometry of the selected cavity

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Figure 1:
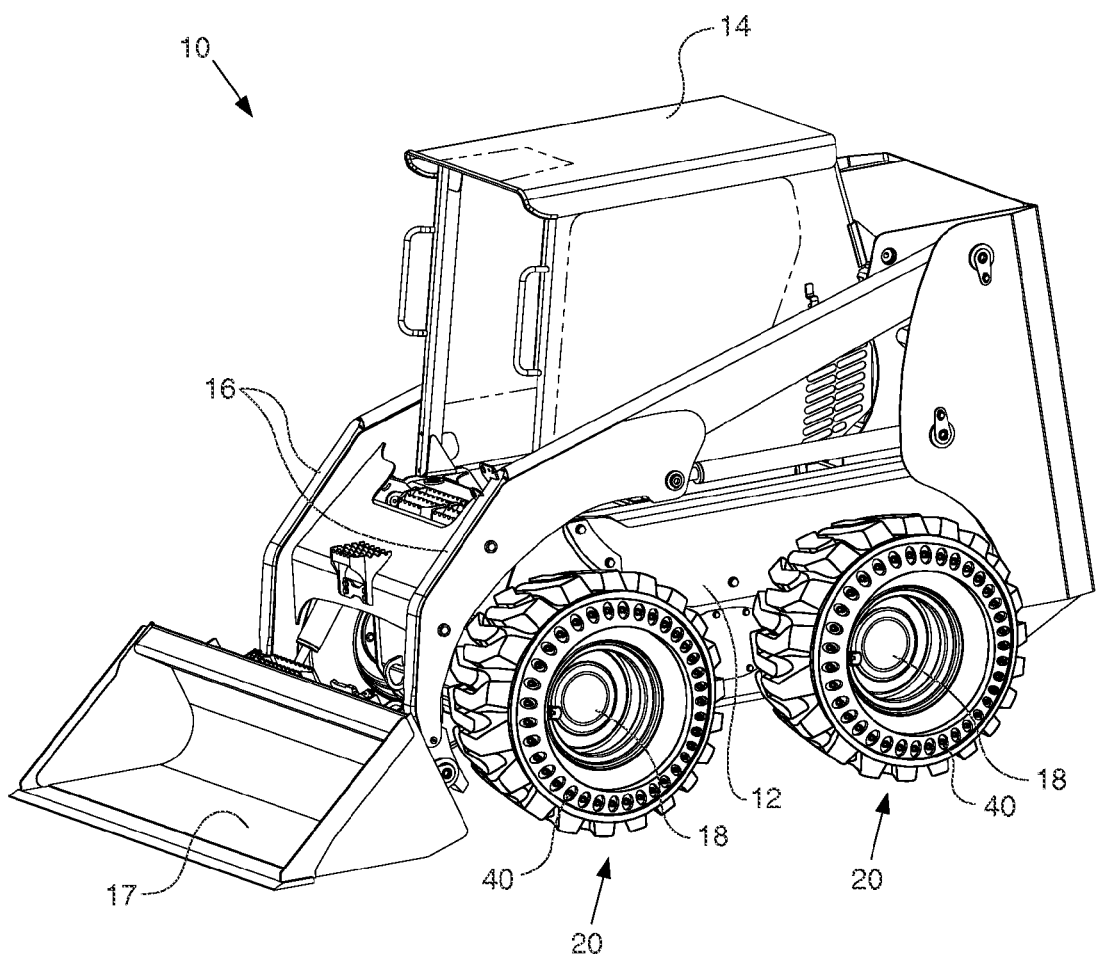
FIG. 1 is a view of a machine having a plurality of tires with a plurality of adjustable inserts, according to one embodiment of the present disclosure.

Referring to FIG. 1, there is shown a view of a machine 10 having a plurality of tires 20, according to one embodiment of the present disclosure. The machine 10 may be a skid steer having a body portion 12, an operator compartment 14, and a lift arm assembly 16. Front and rear sets of tires 20 may be mounted via wheel hubs 19 to axles 18 that extend from each side of the body portion 12. The lift arm assembly 16 may be pivotally mounted to the body portion 12 and pivotally carries a bucket or other implement 17.

Those skilled in the art will appreciate that the present disclosure contemplates various sizes of tires 20, or other ground engaging members, for use in a variety of applications on a variety of machines 10. Machines 10 may include relatively small machines, such as skid steer loaders, small wheel loaders, backhoe loaders, trucks, other small vehicles, and the like, as well as other larger machines that may still be suitable. Ground engaging members may include tires, tracks, and the like that may be suitable for a particular application and in a way that may be adaptable for use with aspects of the present disclosure.

Figure 2:
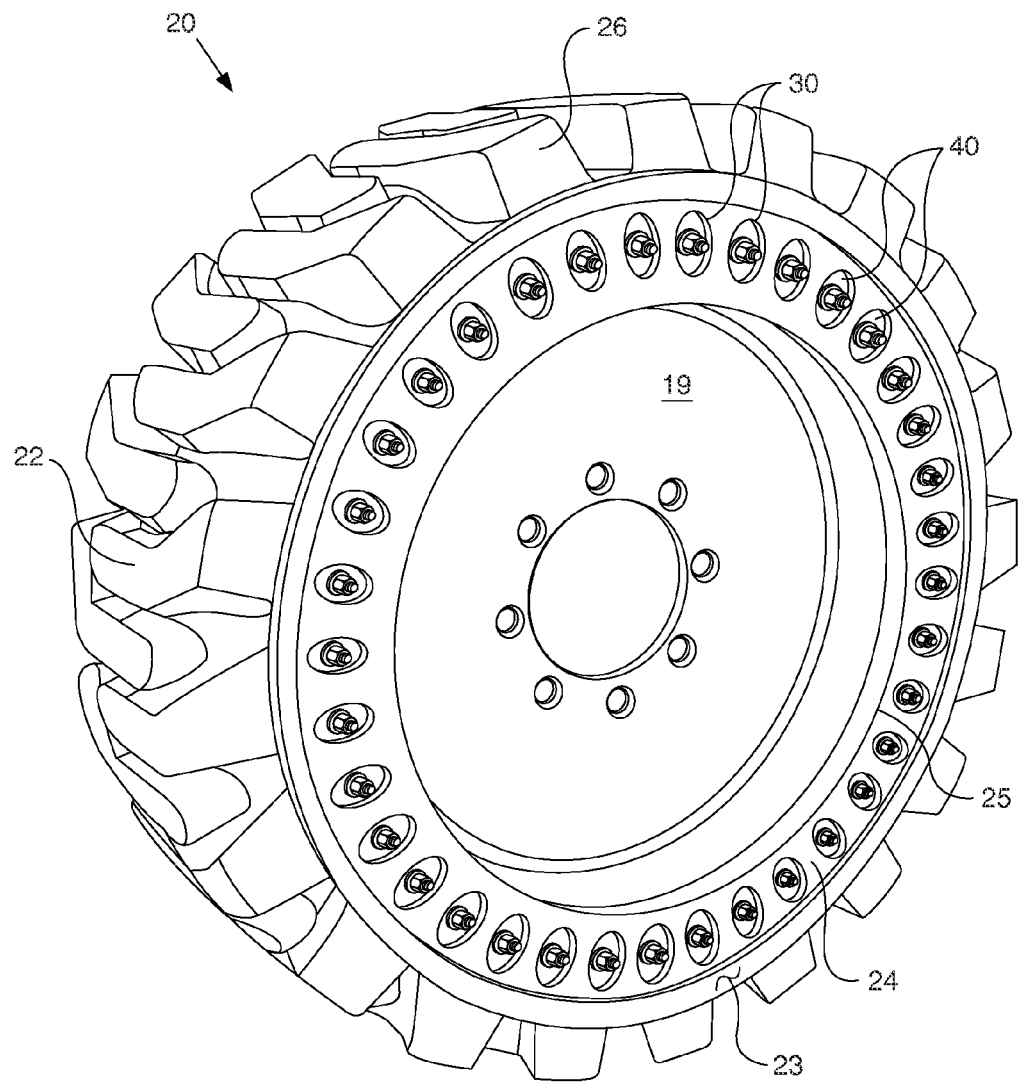
FIG. 2 is a view of a tire having a plurality of cavities containing adjustable inserts, according to one embodiment of the present disclosure.

As seen in FIG. 2, there is shown a view of the tire 20 having a plurality of cavities 30 containing adjustable inserts 40 according to one embodiment of the present disclosure. The tire 20 may include an annular body 22 of elastomeric material. Although the annular body 22 could be made from various elastomeric materials, the annular body 22 may be made from rubber of any suitable tire formulation known in the art. For example, tire 20 might be molded from a natural rubber or a natural/synthetic rubber blend having a Young's Modulus between 1 MPa and 6 MPa at 100% elongation.

Alternatively, fully synthetic elastomers, such as polyurethanes, could also be used. The annular body 22 may include a radial middle region 24, a radial outer region 23 and a radial inner region 25, both of which are adjacent to the radial middle region 24. The radial inner region 25 may attach to a wheel hub 19 in a conventional manner, such as by being directly bonded thereto, and the wheel hub 19 is attached to the machine 10. The radial outer region 25 may include tread 26.

The radial outer region 23 and the radial inner region 25 are preferably, but not necessarily cavity-free, and the radial middle region 24 defines a plurality of unpressurized cavities 30 that are distributed in a pattern. As illustrated in FIG. 2, the cavities 30 are evenly spaced throughout the radial middle region 24. It is contemplated that the pattern of cavities 30 may occur in one or more radial bands of cavities. Multiple radial bands of cavities 30 may or may not overlap, depending upon the desired properties of the tire 20 in a particular set of applications. Furthermore, the band, or bands, of cavities 30 may also have different configurations and orientations.

Although one particular cavity 30 is shown having an oval shape extending through the width of the tire, the present disclosure contemplates use of cavities 30 of various other shapes. The shapes may preferably be symmetrical, but may also be skewed. Further, the present disclosure contemplates a tire 20 including non-uniform cavities 30. Those skilled in the art may appreciate that various configurations of cavities 30, such as the size, shape, number and orientation of the cavities 30, in addition to having multiple bands of cavities 30 may provide a desired stiffness, torque cancellation, and durability of the tire 20.

Each cavity 30 may also have an adjustable insert 40, or expandable plug, that may be arranged to fit within a portion of the cavity 30. Although it is shown in FIG. 2 that each cavity 30 may contain an adjustable insert 40, each cavity 30 may or may not contain adjustable inserts 40. One skilled in the art may appreciate the how the compression, or deflection rate, of the tire 20 may be altered through the use of the adjustable insert 40. It may also be understood how use of the adjustable insert 40 may become increasingly important as the deflection rate may decrease over the life of the tire 20.

Figure 3:
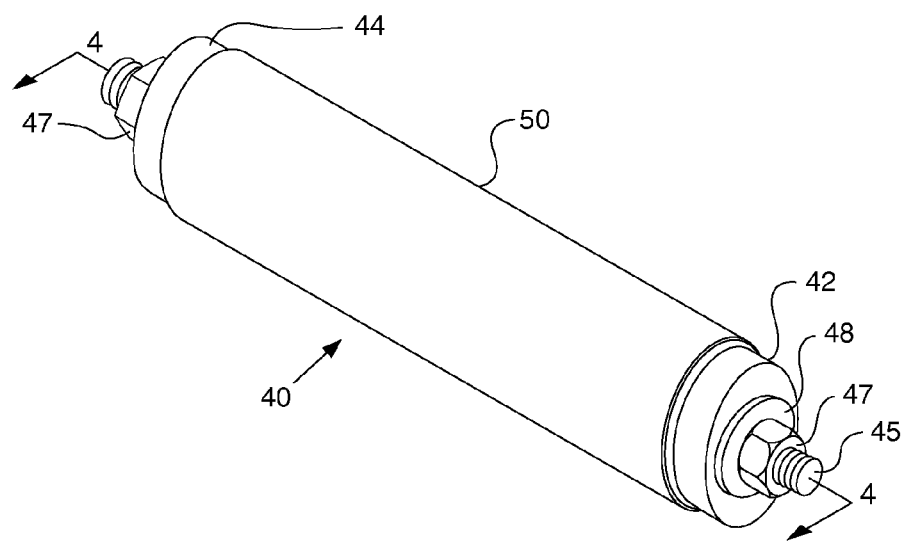
FIG. 3 is a view of an adjustable insert, according to one embodiment of the present disclosure.
Figure 4:
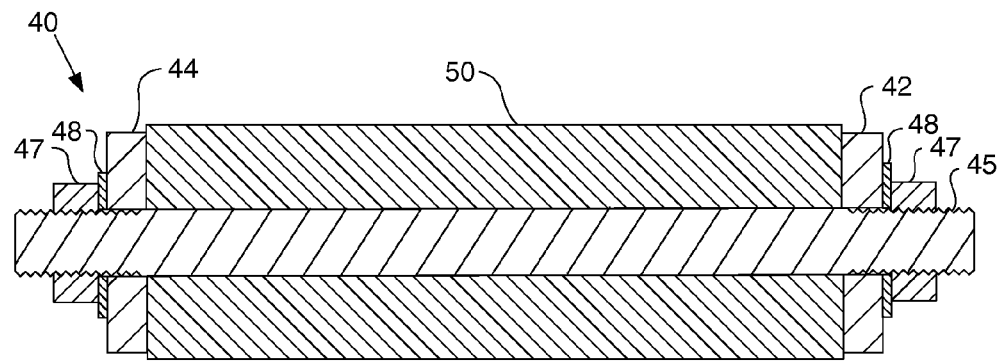
FIG. 4 is a cross section view of the adjustable insert of FIG. 3 according to one embodiment of the present disclosure.

FIGS. 3 and 4 are views of an adjustable insert 40, according to one embodiment of the present disclosure. The adjustable insert 40 may include a first end portion 42, a second end portion 44, a threaded rod 45, nuts 47, washers 48, and an expandable portion 50. This adjustable insert 40 may be configured for a cavity 30 that extends the entire width of the tire 20. In this instance, both nuts 47 may be accessible to be tightened or loosened. As shown in the figures, a non-circular cavity and a corresponding non-circular adjustable insert 40 may enable tightening of the nut 47 while maintaining the orientation of the adjustable insert 40.

Figure 5:
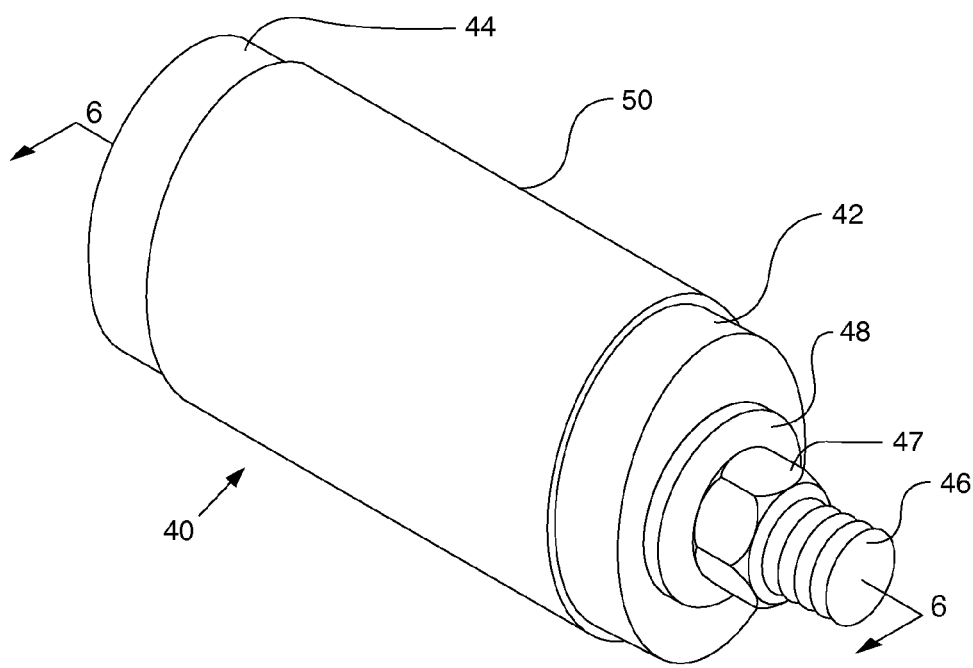
FIG. 5 is a view of an adjustable insert, according to another embodiment of the present disclosure.
Figure 6:
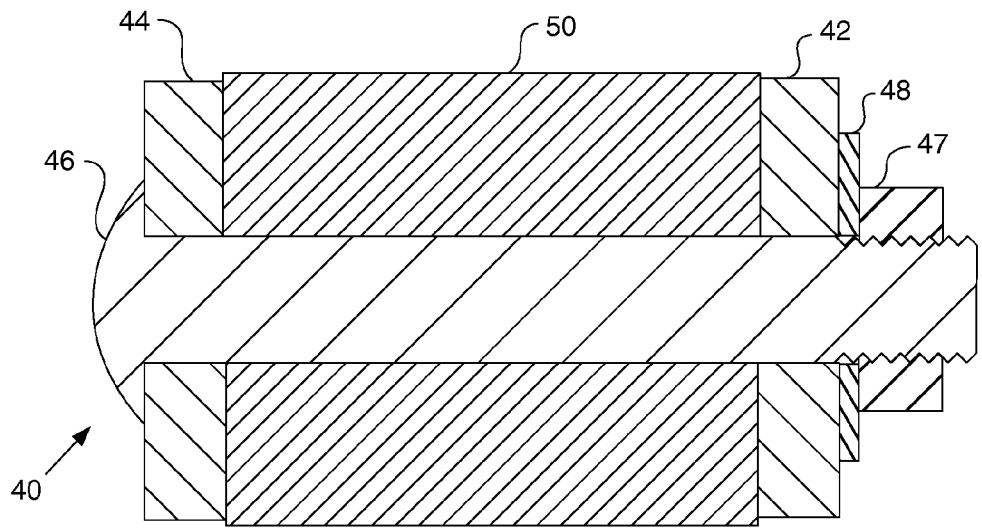
FIG. 6 is a cross section view of the adjustable insert of FIG. 5.

FIGS. 5 and 6 are views of an adjustable insert 40, according to another embodiment of the present disclosure. The adjustable insert 40 of this embodiment may be used for unpressurized cavities 30 that extend the full width of the radial middle region 24 or only a portion of the way through the width of the radial middle region 24 of the tire 20. The adjustable insert 40 may include a first end portion 42, a second end portion 44, a threaded bolt 46, nut 47, washer 48, and expandable portion 50.

In these and other embodiments, the present disclosure contemplates the expandable portion 50 being made of various materials, such as elastomers and the like, and in various configurations that may allow the expandable portion 50 to be adjusted to provide a resistive force against the inner surface of the cavity 30. This force may be such that the compression of the tire 20 may be modified as desired to correspond to a desired operation of a machine 10. Although it is not necessary, the adjustable insert 40, or specifically the expandable portion 50, may be configured to fit snuggly while in an unexpanded state within a portion of the inner surface, or the inner geometry, of the cavity 30.

The adjustable insert 40 and the cavity 30 may also be configured in one of a number of ways to maintain the adjustable insert 40 within the cavity 30 or within a specific portion of the cavity 30. In one embodiment, the adjustable insert 40 may have an outer geometry that is slightly bigger than the inner geometry of the cavity 30 such that the adjustable insert 40 may be press-fit into the cavity 30.

In an alternate embodiment, where the tire 20 may be designed to accept adjustable inserts 40 within the cavities 30, each end of the cavities 30 may be configured with an internal lip (not shown), or a groove and the like, that may abut the outer surface of the first and second end portions 42,44. The internal lips, or grooves, may prevent the adjustable insert 40 from working itself out of the cavity 30 whether expanded or unexpanded and retain the adjustable insert 40 within the cavity 30.

In yet another embodiment, the cavity 30 may be designed such that internal surface of the cavity 30 is concave from one end of the cavity 30 to the other end of the cavity 30. Alternatively, the internal surface of the cavity 30 may include ridges, depressions, and the like. As mentioned above, the outer surface of the expandable portion 50 may correspond to the inner surface, or geometry, of the cavity 30. Accordingly, the outer surface of the expandable portion 50 may have a concave shape or corresponding ridges and the like to maintain its position with the cavity 30.

Furthermore, a cap (not shown) may be installed at each end of the cavity 30. The cap may prevent mud or other debris from reaching the adjustable insert 40 and inhibiting modification of the adjustable insert 40. The cap may also be attached to the radial middle region 24 as a way for maintaining the adjustable insert 40 within the cavity 30.

The first and second end portions 42, 44 in addition to the nuts 47, washers 48 and threaded rod 45, or threaded bolt 46, may create a mechanism by which the expandable portion 50 may apply a resistive force against the inner surface of the cavity 30. Although only a couple of different embodiments are shown for the mechanism, the mechanism may include any one of a number of ways in the art to cause the expandable portion 50 to apply an adjustable resistive force against the inner surface of the cavity 30. It is envisioned that the resistive force may occur using mechanisms actuated by mechanics, pneumatics, hydraulics, electronics, and the like. Accordingly, depending on the mechanism, the adjustable insert 40 may not require the first and second end portions 42,44 to compress the expandable portion 50 to cause it to expand. The mechanism may alternatively be internal to the expandable portion 50.

INDUSTRIAL APPLICABILITY

Operation of the present disclosure will be discussed for a skid steer loader having tires 20, cavities 30 and adjustable inserts 40 using a mechanical tightening mechanism, as illustrated in FIG. 1-6. Those skilled in the art should appreciate that the operation of the present disclosure may be similar for various machines 10 having various ground engaging members with cavities 30 containing adjustable inserts 40 using a variety of mechanisms.

During normal operation of the skid steer loader, the tire 20 will be subjected to a predictable range of radial loads. To absorb the radial loads differently than in a convention solid tire, cavities 30 may be added to absorb the radial loads by deforming the material about the cavities 30. The cavities 30 may be tailored with idea of satisfactorily accommodating the predictable range of radial loads. Accordingly, the tire 20 may have a stiffness less than that of a solid tire to provide the operator with a smoother ride while increasing ground contact and traction. In a case such as this, the tire 20 may not require an adjustable insert 40 until the deflection of the material about the cavities 30 reaches a deflection rate no longer satisfying an acceptable range of radial loads or until the tire is required to handle increasingly higher radial loads not capable with the current design of cavities 30.

Accordingly, an adjustable insert 40 may be inserted into the cavity 30. Tightening the nuts 47 against the washers 48 and the first and second end portions 42,44 may cause the first and second end portions 42,44 to move toward one another and compress the expandable portion 50. The compression may then cause the expandable portion 50 may then expand against the inner surface of the cavity 30. The resistive force of the expandable portion 50 against the inner surface of the cavity 30 may provide a desired amount of compression, or deflection, under a load thereby providing a desired rigidity and traction.

Alternatively, the tires 20 and cavities 30 may be designed from alternative materials or in alternative shapes such that they may require adjustable inserts 40 to accommodate the predictable range of radial loads. In this case, the operator may assess the type of work the machine 10 may perform and accordingly adjust the deflection of the cavities 30 by using the adjustable inserts 40. If the machine will be doing light work, such as cleaning and the like, or working in wet terrain and other harsh environments, the operator may adjust the adjustable insert 40 to allow for the greatest amount of deflection such that the tires have a soft ride for the operator or to maintain adequate traction. If the machine 10 will be working with primarily heavy loads that may create significant tangential forces on the tire, the operator may adjust the adjustable insert 40 to significantly limit the deflection of the cavity 30 to provide traction under high loading. Furthermore, each operator may also be able to select an optimum setting for their own personal use that suits their personal preferences in the overall operation of the machine. A site supervisor may also be able to determine a setting on the adjustable insert 40 that provides an overall optimum productivity for that specific site for each machine 10 and application and lock in that setting.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A non-pneumatic tire, comprising:
    an annular body of elastomeric material defining the non-pneumatic tire and including a radial inner region, a radial middle region, and a radial outer region, wherein the radial outer region includes a tread portion;
    a plurality of unpressurized cavities arranged in the radial middle region of the annular body;
    each of the unpressurized cavities extending a width of the non-pneumatic tire;
    a plurality of adjustable inserts arranged in a portion of the plurality of unpressurized cavities, wherein each adjustable insert further includes:
        an expandable portion sized to fit in the portion of the selected cavity; and
        a mechanism configured to expand the expandable portion against the portion of the selected cavity.

2. The non-pneumatic tire of claim 1, wherein an outer geometry of the expandable portion and an inner geometry of the selected cavity enables operation of the mechanism.

3. The non-pneumatic tire of claim 1, wherein each adjustable insert is configured to reduce compression of the selected cavity.

4. The non-pneumatic tire of claim 1, wherein an outer geometry of each adjustable insert corresponds to an inner geometry of the selected cavity.

5. The non-pneumatic tire of claim 1, wherein an outer geometry of the adjustable inserts expands against an inner geometry of the cavities.

6. The non-pneumatic tire of claim 1, wherein the adjustable inserts are adjusted to modify a deflection rate of the non-pneumatic tire.

7. The non-pneumatic tire of claim 1, wherein the plurality of unpressurized cavities are configured to retain the plurality of adjustable inserts.

8. A ground engaging member, comprising:
    an annular body of elastomeric material;
    a plurality of unpressurized cavities arranged in the annular body;
    each of the unpressurized cavities extending a width of the annular body;
    a plurality of adjustable inserts arranged in a portion of the plurality of unpressurized cavities;
    an expandable portion sized to fit in the portion of the selected cavity; and
    a mechanism configured to expand the expandable portion against the portion of the selected cavity;
    wherein the mechanism is configured to compress the expandable portion between a first and second end of the expandable portion.

9. A method for adjusting the compression of a ground engaging member, comprising:
    structuring an adjustable insert within at least one of a plurality of unpressurized cavities arranged within, and extending a width of, an annular body of elastomeric material of the ground engaging member;
    expanding at least a portion of an outer geometry of the adjustable insert against a portion of an inner geometry of the selected cavity and by tightening the expandable portion between a first and second end of the expandable portion.

10. A non-pneumatic tire, comprising:
    an annular body of elastomeric material defining the non-pneumatic tire with a width, and including a radial inner region contiguous with a radial middle region that is contiguous with a radial outer region;
    the radial inner region is shaped for attachment to a hub;
    the radial outer region includes a tread;
    the radial middle region defines a plurality of cavities arranged in at least one radial band, and each of the cavities extend the width of the non-pneumatic tire,
    a plurality of adjustable inserts that are each received in one of the cavities in contact with a surface that defines the respective cavity, and the adjustable insert includes an expandable portion surrounding a mated nut and bolt; and
    the expandable portion of the adjustable insert expanding against the surface responsive to tightening of the nut and bolt to adjust a rigidity of the non-pneumatic tire.

* * * * *